(12) United States Patent
Milner

(10) Patent No.: US 9,174,176 B2
(45) Date of Patent: Nov. 3, 2015

(54) ULTRASONIC DISPERSION APPARATUS, SYSTEM, AND METHOD

(75) Inventor: Henry Milner, Oceanside, CA (US)

(73) Assignee: Disperse Systems, Inc., Oceanside, CA (US)

( * ) Notice: Subject to any disclaimer, the term of this patent is extended or adjusted under 35 U.S.C. 154(b) by 2351 days.

(21) Appl. No.: 10/754,886

(22) Filed: Jan. 8, 2004

(65) Prior Publication Data
US 2004/0191275 A1 Sep. 30, 2004

Related U.S. Application Data

(60) Provisional application No. 60/439,227, filed on Jan. 9, 2003.

(51) Int. Cl.
*B01F 15/00* (2006.01)
*B01F 1/00* (2006.01)
*B01F 11/02* (2006.01)
*B01J 19/10* (2006.01)

(52) U.S. Cl.
CPC ............ *B01F 1/0005* (2013.01); *B01F 11/0283* (2013.01); *B01J 19/10* (2013.01); *B01F 2215/0032* (2013.01); *B01J 2219/089* (2013.01)

(58) Field of Classification Search
CPC ... B01F 1/05; B01F 11/283; B01F 2215/0032
See application file for complete search history.

(56) References Cited

U.S. PATENT DOCUMENTS

| | | | |
|---|---|---|---|
| 3,542,345 A * | 11/1970 | Kuris | 366/113 |
| 3,774,317 A | 11/1973 | Balamuth et al. | |
| 3,793,723 A | 2/1974 | Kuris et al. | |
| 3,809,977 A | 5/1974 | Balamuth et al. | |
| 3,828,770 A | 8/1974 | Kuris et al. | |
| 3,924,335 A | 12/1975 | Balamuth et al. | |
| RE28,752 E | 3/1976 | Balamuth et al. | |
| 3,980,906 A | 9/1976 | Kuris et al. | |
| 3,990,512 A | 11/1976 | Kuris | |
| 4,012,647 A | 3/1977 | Balamuth et al. | |

(Continued)

FOREIGN PATENT DOCUMENTS

WO    WO 97/07891    3/1997

OTHER PUBLICATIONS

Lockwood et al (British Journal of Anaesthesia, vol. 79, Issue 4 (1997) 517-520).*

(Continued)

*Primary Examiner* — Benjamin Packard
(74) *Attorney, Agent, or Firm* — Knobbe Martens Olson & Bear LLP

(57) ABSTRACT

An apparatus, system, and method of dispersing solid forms of drugs or medications reliably and consistently may generally employ ultrasonic energy. The disclosed embodiments facilitate preparation of a liquid dose from solid medications for administration to a patient.

15 Claims, 5 Drawing Sheets

(56) References Cited

U.S. PATENT DOCUMENTS

| | | | |
|---|---|---|---|
| 4,043,084 A | 8/1977 | Kuris | |
| 4,071,385 A | 1/1978 | Kuris | |
| 4,126,547 A | 11/1978 | Kuris | |
| 4,192,035 A | 3/1980 | Kuris | |
| 4,193,196 A | 3/1980 | Kuris et al. | |
| 4,193,197 A | 3/1980 | Kuris et al. | |
| 4,222,868 A | 9/1980 | Kuris | |
| 4,333,197 A | 6/1982 | Kuris | |
| 4,528,159 A * | 7/1985 | Liston | 422/65 |
| 4,974,214 A * | 11/1990 | Forster et al. | 367/98 |
| 5,538,503 A * | 7/1996 | Henley | 604/20 |
| 5,833,891 A * | 11/1998 | Subramaniam et al. | 264/7 |
| 6,047,246 A * | 4/2000 | Vickers et al. | 702/105 |
| 6,079,508 A * | 6/2000 | Caza | 175/66 |
| 6,136,859 A * | 10/2000 | Henriksen | 514/561 |
| 6,147,108 A * | 11/2000 | Hauptman | 514/449 |
| 6,534,087 B2 * | 3/2003 | Busson et al. | 424/464 |

OTHER PUBLICATIONS

1913 Disperser Description.
http://www.cambridgeconsultants.com—Tablet sampling—a new process for quality control and general tablet development.
http://www.mehy.com.eg—Water Tablet Processing System. Automated HPLC-based Content Uniformity Testing for Pharmaceutical Dosage Forms.
Branson Sonifer® Cell Disruptor, High-intensity Cup Horn.
Berliner, S., III, "Ultrasonics p. A"—web site printed Oct. 12, 2008, http://home.att.net/~Berliner-Ultrasonics/usonicsa.html (1-12).
Mason, Timothy J., "Practical Sonochemistry" User's Guide to Applications in Chemistry and Chemical Engineering, Pub. Ellis Horwood Limited, 1991, pp. 1-113.

* cited by examiner

ULTRASONIC DISPERSION APPARATUS, SYSTEM, AND METHOD

CROSS-REFERENCE TO RELATED APPLICATIONS

The present application claims priority under 35 U.S.C. §119(e) to U.S. Provisional Patent Application No. 60/439,227, filed on Jan. 9, 2003.

FEDERAL SUPPORT CLAUSE

This invention was made with Government support under Grant Number 2R44GM066436-02A1 awarded by the U.S. Public Health Service. The Government has certain rights in the invention.

FIELD OF THE INVENTION

Aspects of the present invention relate generally to reducing drugs or medications in solid form to liquid form, and more particularly to an apparatus, system, and method of dispersing solid form medications utilizing ultrasonic energy.

DESCRIPTION OF THE INVENTION

It has long been recognized that one of the preferred ways of administering medication is orally in solid form; solid form medications are usually embodied in tablets, capsules, or a hybrid thereof typically known as "caplets." Providing medications in solid form generally allows utilization of the least expensive manufacturing and packaging processes for drugs or medications. Additionally, solid form oral medication administration is non-invasive, and the solid form facilitates tamper resistance. Accordingly, distribution in solid form is generally preferred for drugs of numerous descriptions.

Recently, however, several problems associated with administering medication in solid form have been identified. For example, tablets, capsules, or caplets containing therapeutic amounts of drugs in solid form are often large, and can induce a gag reflex or the unwanted aspiration of drug material. In particular, some individuals are unable to ingest solid medication. By way of example, some or all of the following groups may experience difficulties in swallowing solid drugs: invalids and mentally ill patients; patients dependent upon feeding tubes; geriatric patients or children; and bedridden patients. It will be appreciated that in some instances, ingesting solid forms of drugs may be impossible, such as in the case of unconscious or comatose patients, for example.

While it may be advantageous under many circumstances to deliver drugs in liquid form, such administration of liquid medicinal doses may be impractical, since many drugs are only available in solid form. Additionally, current and traditional techniques for dispersing solid drugs and creating a solution or liquid for administration are deficient in many respects substantially as set forth below.

One historical method of preparing oral medication in solid form has involved the use of a traditional mortar and pestle; this age-old apparatus facilitates manual crushing of the solid drug into a powder. As is generally recognized in the art, however, the use of a mortar and pestle presents as many problems as it solves: the implements require careful and thorough cleaning after each use to prevent cross-contamination with different drugs; manual crushing is generally laborious and relatively time intensive; crushed powder escaping from or adhering to the mortar or the pestle can reduce the ultimate dosage transferred to the patient, resulting in an improper dosage; and manual crushing can result in varying and inconsistent particle sizes, which may affect the ultimate dosage or assimilation time, or adversely influence feeding tubes or other apparatus.

Specifically, completely crushing solid drugs may be very difficult due to the considerable force required; further, achieving consistency from one crushing operation to the next may be even more difficult. Applying the requisite force and achieving even marginal consistency often prove to be very problematic for staff members in hospitals and other medical facilities, particularly where many patients require dispersion of solid medications. If the solid drug is not completely crushed, larger particles may clog feeding tubes, for example, which may lead to incidental costs related to tube maintenance or replacement, additional patient discomfort and interruption of nutrition, and caregiver remedial efforts and time devoted to correcting a problem which may not have occurred if the proper device were used in the first instance.

Additional drawbacks may include either or both of the following, for example: incidental caregiver drug exposure from handling powders; and reduced or inconsistent quality of the medication course or overall patient treatment regimen. Such inconsistencies or reduced quality levels may depend upon caregiver knowledge, skill, available time to devote to the crushing task, motivation, and other factors.

Research efforts to overcome some of the known limitations associated with utilization of a mortar and pestle have resulted in development and introduction of several manual and motor driven devices to crush solid drugs. Newer devices include crushing syringes, hammer-like apparatus, and leveraged or articulated presses.

These devices suffer from many of the shortcomings noted above, not the least of which, particularly with respect to the manual devices, is the continuing difficulty associated with applying an appropriate and consistent amount of pressure suitable to facilitate creation of a uniform powder for dispersion. Other deficiencies, particularly with respect to the motor driven devices, include relative expense, noise attendant with operation, and the possibility of contamination. Additionally, legacy mechanical devices cannot properly crush hard or soft capsular material, rendering such conventional apparatus useless with respect to these types of dosage forms.

SUMMARY

Embodiments of the present invention overcome the above-mentioned and various other shortcomings of conventional technology, providing an apparatus, system, and method of dispersing solid forms of drugs or medications reliably, consistently, quickly, and quietly. A system and method operative in accordance with some embodiments, for example, may employ ultrasonic energy, facilitating preparation of a liquid dose from solid medications for administration to a patient; it will be appreciated that dispersion of the solid medications and preparation of the liquid dose may occur immediately prior to administration.

The foregoing and other aspects of various embodiments of the present invention will be apparent through examination of the following detailed description thereof in conjunction with the accompanying drawings.

DETAILED DESCRIPTION

Figure 1:
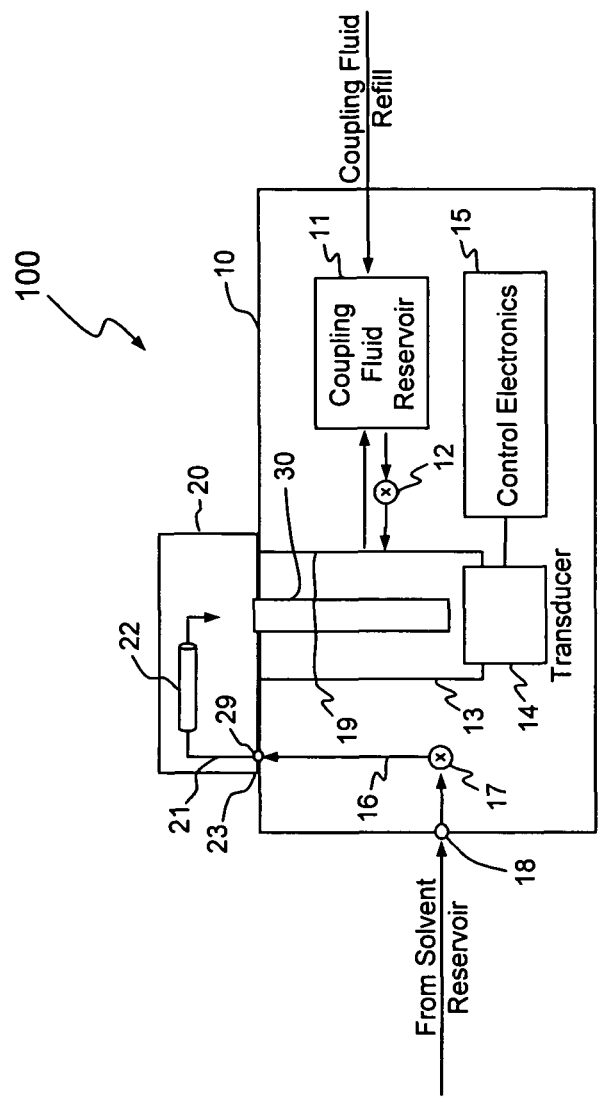
FIG. 1 is a simplified block diagram illustrating one embodiment of an ultrasonic dispersion apparatus.

In accordance with one aspect of the present invention, for example, an ultrasonic dispersion system and method may provide efficient, effective, and consistent solid drug dispersion for individuals or the care-giver industry. Embodiments of the disclosed system and method address the above-mentioned drawbacks of conventional devices and techniques. For example, in some implementations, a system and method operative as set forth below may disperse most solid drug types, such as tablets (i.e., immediate release, coated, and uncoated) as well as capsules (i.e., both hard and soft gelatins).

In some embodiments, a system and method as disclosed herein may disperse multiple treatments (i.e., drugs or drug combinations provided in one or multiple solid forms such as tablet and capsule combinations) simultaneously. Additionally, a system and method of dispersing solid medications may prevent the introduction of contaminants from one dispersion operation to the next, and minimize or eliminate user clean up requirements.

In accordance with another aspect, an ultrasonic dispersion method operative in accordance with the present disclosure may achieve a processing time of one minute or less, and may process thousands of doses per year; an apparatus implementing such a method may be embodied in an automated, tabletop, or hand-held device which is easy to use and powered by an alternating current (AC) or a direct current (DC, or battery) power source.

It will be appreciated that some drugs, such as sustained-release or targeted-release drugs, for example, are not intended to be fully dispersed prior to administration, for various reasons. Sustained-release solid drugs or medications are generally designed to dissolve or to release contents gradually over a predetermined period of time. Rapid, pre-administration dispersion may impede the operation or entirely negate the intended effects of such medications. With respect to targeted-release dosing strategies, the targeted-release may be achieved by implementation of a special coating, for example, which provides a suitable or necessary delay period calculated to ensure that the solid drugs will dissolve at the right place in the human body. Under certain circumstances, therefore, pre-administration dispersion of targeted-release drugs may alter the above-mentioned delay period, which may in turn cause the solid drug to be assimilated in an undesirable or less preferred portion of the digestive tract.

Nevertheless, dispersion of this type of solid drug in accordance with the disclosed system and method is possible, and is both contemplated and enabled by the present disclosure. Those of skill in the art will appreciate that the utility of the present invention is not to be construed as limited by any specific type of medication or its intended use in solid form.

The term "dispersion" in this context generally refers to the process or mechanisms (either physical, chemical, or some combination thereof) by which solids may be suspended, dissolved, or emulsified in solution, i.e., dispersion results in the physical breakup or disintegration of an agglomerate or a monolithic solid phase and the formation of smaller particles which may remain intact or fully dissolve. Dispersion as contemplated herein is effectuated or facilitated by ultrasonic waves; accordingly, dispersion may occur where forces exerted on a solid disposed in or exposed to an ultrasonic field meet or exceed a particular level of frequency, intensity, or both. The internal stresses of the solid (i.e., the forces to be overcome in effectuating dispersion) are typically defined by the solid's strength and plasticity. In the general case, mechanical properties of a material are determined by binding forces between the constituting particles. In agglomerates, these binding forces are not typically high; binding forces in a monolithic body, however, are much higher.

Excessive pressures arising in a liquid under the action of ultrasound may be responsible for the dispersion of a solid immersed in the liquid. Dispersion, in this case, may be facilitated by one or more of the following phenomena: fluid cavitation; micro- and macro-streamings of various origins, intensities, and magnitudes; and hydrodynamic forces.

Turning now to the drawings, FIG. 1 is a simplified block diagram illustrating one embodiment of an ultrasonic dispersion apparatus. In the exemplary embodiment, apparatus 100 generally comprises a body portion 10 and a lid portion 20 configured and operative to be coupled selectively or removably to body 10 substantially as set forth in detail below.

As indicated in FIG. 1, body 10 may house or comprise numerous finctional components including, but not limited to: a coupling fluid reservoir 11; a coupling fluid recirculation pump 12; a reactor vessel 13; an ultrasonic transducer 14 operably coupled to control electronics 15; a solvent delivery conduit or line 16; and a solvent delivery pump 17. Lid 20 may generally comprise a solvent delivery conduit 21 selectively coupled at a conduit junction 29 to line 16, one or more heating elements 22, and a hinge 23 or other structure operative to provide relative movement of lid 20 with respect to body 10. Some elements, such as electronics 15 and solvent pump 17, for example, may be shared between body portion 10 and lid portion 20; additionally or alternatively, some components may be relocated from body 10 to lid 20 or vice-versa, in some implementations.

It will be appreciated that some illustrated components (such as pumps 12 and 17, transducer 14, electronics 15, and heater 22 for example) may require or rely upon one or more power sources for necessary operating voltage during use. In that regard, body 10, lid 20, or both may comprise, incorporate, or accommodate attachment to appropriate electrical power sources facilitating operation of the various powered electrical and electromechanical elements of apparatus 100. In some embodiments, for example, body 10 may comprise one or more primary or secondary battery banks, alternating current (AC) power inputs and attendant transformers, voltage regulators, surge protectors, and the like (not shown), or some combination thereof, as well as suitable power transfer conduits or electrical wiring as is generally known in the art.

In some applications, body 10 may be coupled to an external AC power source during normal operation; in addition to powering various components of apparatus 100, such an AC power source may also recharge (or maintain at optimal voltage) one or more rechargeable secondary cells, or back-up batteries, housed within body 10 and configured to supply operating voltage to powered components in the event of AC power failure or portable operation of apparatus 100. Such power delivery strategies employing AC power supporting, or augmented by, rechargeable battery systems are generally known in the art, and may have particular utility where volatile Random Access Memory (RAM) is implemented in conjunction with control electronics 15 as set forth in more detail below.

During use, reactor vessel 13 may accommodate a receptacle 30 into which ultrasonic energy is coupled; in that regard, vessel 13 may receive an appropriate or predetermined amount of coupling fluid such that coupling fluid occupies a selected volume of vessel 13 as illustrated by the coupling fluid level 19 in FIG. 1. Coupling fluid recirculation pump 12 may provide a desired circulation (at a predetermined or dynamically adjusted flow rate, for example) of coupling fluid from coupling fluid reservoir 11, into vessel 13, and back to reservoir 11. Recirculation pump 12 may be embodied as a peristaltic or roller pump, for example, or as a shaft-driven pump such as those employing centrifugal or reciprocating pumping mechanisms.

In operation, coupling fluid in vessel 13 serves both to deliver ultrasonic energy to receptacle 30 efficiently as well as to communicate heat from receptacle 30 and vessel 13, as is generally known in the art. Accordingly, coupling fluid may be selected from among various options generally known in the art to have appropriate physical and chemical properties (e.g., viscosity, specific gravity, vapor pressure, heat transfer characteristics, and the like). In some embodiments, for example, coupling fluid may be distilled water; alternatively, coupling fluid may be any of numerous other fluids known to exhibit suitable properties and generally understood to provide utility in the ultrasonic arts. Though it will be appreciated that selection of the coupling fluid may influence other design considerations and vice-versa, the present disclosure is not intended to be limited by the nature or physical characteristics of any particular coupling fluid.

In accordance with some embodiments, coupling fluid may comprise a solution including fully dissociated salts (e.g., calcium chloride or sodium chloride) in a concentration operative to depress coupling fluid vapor pressure. Solute concentration may be selected as a function of, inter alia, the type of coupling fluid and the desired reduction in coupling fluid vapor pressure. In accordance with Rault's Law, solute reduction of vapor pressure may result in decreased cavitation in the coupling fluid itself, increasing acoustic transmission (ultrasonic power coupling) to receptacle 30.

It will be appreciated that the flow rate of coupling fluid circulating through reservoir 11 and vessel 13 may be driven by pump 12 at a selected value depending upon numerous factors including, but not limited to: the volume of vessel 13 and the displacement of receptacle 30; the overall volume of coupling fluid maintained in reservoir 11; the viscosity and heat transfer characteristics of the selected coupling fluid; the nature and intensity (frequency and amplitude) of ultrasonic energy delivered to receptacle 30 through the coupling fluid; any heat exchangers, fans, or other cooling devices employed in conjunction with reservoir 11; the instantaneous temperature of (or temperature trends in) coupling fluid or structural elements of vessel 13; and so forth. The foregoing list is not intended to be inclusive.

Accordingly, body 10 may further comprise various sensors (not shown) coupled to control electronics 15 or to other dedicated microcontrollers or microcomputers configured and operative to influence the functionality of components in apparatus 100. Electronics 15 may be operative in accordance with sensor input, for example, enabling dynamic adjustment of the functionality of coupling fluid recirculation pump 12 or other components. For instance, output from one or more level sensors disposed in or used in conjunction with vessel 13 may affect operational flow rates of coupling fluid through pump 12 or through the recirculation conduits between vessel 13 and reservoir 1 1 (represented by the arrows in FIG. 1); additionally or alternatively, one or more dynamically controllable valve assemblies (not shown) may be selectively manipulated in accordance with sensor input, enabling coupling fluid level 19 to be maintained as desired.

Further, one or more fluid level sensors may also monitor the level or volume of coupling fluid in reservoir 11 and provide an indication when refill is appropriate or required. As indicated by the arrow in FIG. 1, reservoir 11 may be filled from an external coupling fluid source manually, for example, or automatically in response to level sensor output signals; where fluid levels in reservoir 11 are maintained automatically, for instance, one or more additional fluid conduit junctions and pumping mechanisms (not shown in FIG. 1) may be included as appropriate to fill reservoir 11 from an external tank or other vessel. Alternatively, additional conduits, pumping mechanisms, and valving arrangements may be employed in conjunction with pump 17 and solvent inlet 18 (described below) selectively to deliver coupling fluid to reservoir 11.

Additionally, one or more thermocouples or other temperature sensors may be disposed in selected locations in vessel 13, reservoir 11, recirculation conduits, or some combination thereof; in some embodiments, control electronics 15 or another independent microcontroller may selectively drive pump 12 in accordance with input from one or more of the various sensors to maintain coupling fluid at a desired or optimum operating temperature.

As noted generally above, ultrasonic transducer 14 may be operably coupled to control electronics 15 and may generally function responsive to signals transmitted therefrom. Specifically, transducer 14 may selectively convert electrical energy into mechanical energy (in the form of ultrasonic waves), as is generally known in the art. In some embodiments, transducer 14 may be implemented as one of the various types (e.g., magnetostrictive or piezoelectric) of electromechanical ultrasonic transducer elements known in the art or developed and operative in accordance with known principles. While the present disclosure is not intended to be limited to specific applications employing any particular embodiment of transducer 14, the following discussion of ultrasonic transducer design considerations is provided by way of background.

Magnetostrictive materials such as nickel, for example, may expand and contract when placed in or exposed to an alternating or fluctuating magnetic field. Alternating electrical energy from a generator (operating responsive to control electronics 15, for example) in or coupled to transducer 14 may be converted into an alternating magnetic field using fluctuating currents in a solenoid or toroid. Such an alternating magnetic field may be used to induce mechanical vibrations at a selected ultrasonic frequency in resonant strips of magnetostrictive material at transducer 14.

In operation, magnetostrictive materials generally respond similarly to magnetic fields of either polarity; application of alternating magnetic fields having opposite polarity will affect the shape or distortion of the magnetostrictive material in the same way despite the opposite polarity of the successive fields. Accordingly, the frequency of the electrical energy applied to transducer 14 incorporating magnetostrictive materials may be computed to be one half of the desired output frequency. Embodiments of transducer 14 employing magnetostrictive technology may be simple and inexpensive to construct, and may further be characterized by robust mechanical and electrical properties. Such implementations may be suited for generation of energy in the lower ultrasonic frequency range (for example, about 20 kHz -40 kHz). In this range, sufficient output may be obtained to disperse solid state material in receptacle 30 as set forth below, especially if heat produced by mechanical, electrical, and magnetic losses is removed by circulation of the coupling fluid at an appropriate rate as described above, for example.

In accordance with some more efficient embodiments, for example, transducer 14 may be based on piezoelectric technology and design concepts generally known and accepted in the art. During use, application of an electric field may generally produce a corresponding or proportional change in the physical shape of piezoelectric material. Piezoelectric transducers are usually constructed of quartz, tourmaline, Rochelle, barium titanate, lead zirconate titanate, or ceramics having strong ferroelectric properties, though other suitable materials are encompassed by the present disclosure.

Embodiments of transducer 14 comprising piezoelectric material may vibrate at a natural or resonant frequency determined by dimensions, structural connections, or other physical characteristics of the piezoelectric portion and the manner in which it interacts with other components of transducer 14. In one exemplary embodiment, transducer 14 may comprise one or more discs of piezoelectric material disposed between a pair of metal end masses as is generally known in the art; the natural resonant frequency in such an embodiment may be a finction of disc thickness.

In general, piezoelectric materials have poor thermal capacity and low tensile strength; these characteristics may consequently reduce the power output capacity of transducer 14 unless compensated by implementation of end masses having low acoustic loss (e.g., end masses constructed of titanium or aluminum) as known in the art. The length of transducer 14 when operative in accordance with current piezoelectric technology may be half-wave at the required or desired operating frequency.

Essentially, three piezoelectric transducer classifications may have utility in high-power ultrasound applications: sandwich or Tonpils (constructed substantially as set forth above); Horn, which has a converging front section that is used as a velocity transformer; and Sonotrode, which has a front mass designed and dimensioned to enhance radial resonance. Other types of transducer technologies, such as parabolic transducers and multiple transducer arrays or arrangements, for example, are within the scope and contemplation of the present disclosure. As noted above, the present disclosure contemplates use of any suitable embodiment of transducer 14 which is operative in accordance with the functional characteristics described, and is not intended to be limited to the exemplary technology.

The electrical forces used to excite transducer 14 into vibration may originate from various shaped pulses, ranging from very sharp electrical spikes to sine waves corresponding to the resonant frequency of transducer 14. Some embodiments of transducer 14 may respond well to a soft spike with a slow rise and fall in voltage; alternative embodiments may require fast rise times. In the FIG. 1 arrangement, such shaped pulses may be produced by an ultrasonic generator (not shown) under control of control electronics 15.

It will be apparent to those of skill in the art that transducer 14 behaves as an aggregate of capacitors, an inductor, and a resistor, and consequently responds in a predictable manner to varying voltages and current-phase relationships. Furthermore, transducer 14 may generally respond to impedance values during both excitation and ringing processes. In that regard, suitable inductors, capacitors, resistors, and transformers, or some combination thereof may be selectively inserted in the current path to match transducer 14 to the ultrasonic generator providing the electrical energy responsive to signals from electronics 15.

Returning now to FIG. 1, an exemplary ultrasonic bath embodiment generally comprises one or more ultrasonic transducers 14 powered by an ultrasonic generator (not shown) under control of electronics 15. Transducer 14 may be fixed to, or extend into vessel 13 as is generally known in the art. Vessel 13 may be embodied in a stainless steel or glass tank, for example, or the equivalent thereof. In that regard, aluminum, titanium, or other metals, as well as various plastics or ceramics, for example, may also be employed in some applications. While use of glass tanks is typically less common in the art (glass may break if acoustic intensity exceeds a predetermined threshold), some embodiments of apparatus 100 may employ a glass vessel 13 in conjunction with a viewing port or window in body 10; a user of apparatus 100 may view ultrasonic, mechanical, or chemical effects, such as cavitation and streaming, in applications employing a glass vessel 13.

The frequency and power provided by the FIG. 1 embodiment may depend upon, among other things, the type and number of transducers 14 employed to deliver ultrasonic energy to vessel 13. Generally, the acoustic power available in an ultrasonic bath such as illustrated in FIG. 1 may be maintained in a range of between about 1 W/cm$^2$ and about 6 W/cm$^2$; at such intensities, cavitation damage to the walls of vessel 13 may be avoided or minimized depending upon, among other factors, the material selected for vessel 13. For proper dispersion of solid material in receptacle 30, transducer 14 may be configured and operative to generate sufficient power to promote cavitation at one or more selected locations within reaction vessel 13. Typically, the operating frequency of transducer 14 may range from about 20 kHz to about 40 kHz as noted above.

The highest acoustic intensities may be obtained at fixed or predictable levels throughout the depth of vessel 13 above transducer 14. This phenomenon may be attributed to the generation of standing waves resulting from or amplified by reflection of emitted pressure waves off of the fluid/air interface at coupling fluid level 19; such standing waves are typically separated by distances of half-wavelength of sound in the coupling fluid (e.g., for water, this half-wavelength is approximately 2.88 cm at 25.7 kHz). If the coupling fluid level 19 is not maintained at an appropriate location in vessel 13 to promote or to accommodate such standing waves, apparatus 100 may generate less than optimal intensities.

Accordingly, it will be appreciated that coupling fluid level 19 may be selectively manipulated (for example, by driving pump 12, selectively controlling valve assemblies, or both as set forth above) in accordance with coupling fluid properties, frequency, intensity, and general operational characteristics of transducer 14, time-dependent or location-dependent temperature variations of coupling fluid, and the like. Additionally or alternatively, vessel 13 and receptacle 30 may be so dimensioned as to locate selected portions of receptacle 30 at desired areas of vessel 13 during use as set forth in more detail below.

In that regard, receptacle 30 configured and operative for use in conjunction with vessel 13 may be embodied in a standard or proprietary glass or plastic test tube or the equivalent thereof, ie., a generally rigid container sized and dimensioned to accommodate a dosage of solid medication and sufficient liquid solvent to enable dispersion of that medication into a solution. In some embodiments, for example, receptacle 30 may be embodied in a disposable plastic cupule such as is typically used in laboratories, hospitals, and other medical care facilities. Alternatively, receptacle 30 may be embodied in a flexible or collapsible plastic tube or generally cylindrical container. Embodiments of receptacle 30 are described in more detail below with reference to FIGS. 3 and 4.

As noted above, receptacle 30 may be configured and operative to receive both solid material to be dispersed as well as a solvent into which the solid is suspended in solution as a result of the application of ultrasonic energy. In some embodiments of apparatus 100, the contents of receptacle 30 are situated at a selected location in vessel 13 during the dispersion process.

As indicated in FIG. 1, body 10 may also comprise solvent delivery conduit or line 16 and solvent delivery pump 17. In an alternative implementation, these components may be incorporated into lid portion 20. As represented by the arrows in FIG. 1, solvent from one or more external reservoirs may be communicated through line 16 by pump 17 into receptacle 30. In some implementations, line 16 may comprise one or more lumens, and pump 17 may be embodied in or comprise one or more pumping mechanisms. In a multi-lumen, multiple pump embodiment, a given solvent may selectively be communicated along a respective one of the multiple lumens in line 16.

A "solvent" as contemplated in this context generally refers to a liquid into which a solid medicinal dose may be dispersed, creating a liquid form of dosage for ultimate administration to a patient. Selection of the type of solvent (i.e., molecular composition and chemical properties) employed as well as the quantity of solvent delivered to receptacle 30 may be influenced by various factors including, but not limited to: the type and overall volume of the solid to be dispersed; anticipated frequency and amplitude of the ultrasonic energy coupled into receptacle 30; anticipated operating temperature inside receptacle 30 during dispersion; possible chemical interactions with the drug in solid form; and so forth.

In the FIG. 1 implementation, a solvent reservoir may be coupled to delivery line 16 in body 10 at a valve assembly or inlet 18, generally comprising fluid conduit junction hardware. Inlet 18 may include or comprise a safety valve or the equivalent thereof, preventing back-flow of solvent from line 16 to the reservoir. Additionally or alternatively, inlet 18 may comprise a quick-disconnect coupling, enabling easy and efficient coupling and decoupling of line 16 and one or more reservoirs; in this embodiment, different solvents may be coupled to line 16 through inlet 18 with minimal effort or expertise on the part of an operator of apparatus 100. In the foregoing embodiment, a solvent waste reservoir or drain conduit (not shown) may be incorporated into body 10 for flushing delivery line 16 when changing or substituting solvents.

Alternatively, it will be appreciated that an external solvent reservoir may comprise more than one reservoir; in such an alternative embodiment, each respective one of a plurality of external reservoirs may maintain a supply of a respective solvent for delivery to a particular lumen in a multi-lumen line 16.

Solvent delivery pump 17 may comprise or incorporate any of the various pumping hardware mechanisms noted above with reference to recirculation pump 12. In operation, pump 17 may be operative in accordance with signals transmitted from electronics 15, and may deliver an appropriate or desired volume of solvent through delivery line 16. In the FIG. 1 embodiment, delivery line 16 is coupled to a similar delivery line 21 in lid 20 at a fluid conduit junction 29 as set forth above. It will be appreciated that, in a multi-lumen embodiment, line 21 may comprise a comparable number of lumens as line 16.

Electronics 15 may generally comprise one or more microprocessors, microcontrollers, or microcomputers generally known in the art and operative selectively to perform computer executable instructions encoded in computer-readable media. In that regard, it will be appreciated that electronics block 15 may comprise or encompass such a processor as well as, inter alia, attendant electronic memory or data storage media (such as volatile or non-volatile RAM, Read-Only Memory (ROM), Erasable/Programmable ROM (EPROM), magnetic or optical disk media, and the like), executable software or firmware instruction modules, input/output hardware, and the like.

For example, body 10, lid 20, or both may optionally include an input device such as a key pad, an output device such as a liquid crystal display (LCD) panel, a combination input/output device (e.g., such as a touch-sensitive display panel), or some suitable combination thereof enabling interaction with various programmable or reconfigurable components of electronics 15. In accordance with such an embodiment employing electronics 15 having input/output capabilities, operational parameters of apparatus 100 may be viewed, configured, modified, or otherwise manipulated as generally known in the art. Accordingly, the foregoing system parameters noted above as being variable or dynamically adjustable may be controlled or modified as desired via interaction with electronics 15, such as through an interactive display panel and one or more suitable input devices.

By way of example, some or all of the following system parameters may be altered under control of or facilitated by electronics 15: flow rates through pumps 12 and 17; coupling fluid level 19 and temperature; operating frequency, amplitude, and duration of output from transducer 14; volume of solvent delivered to receptacle 30; and so forth. The foregoing list is not intended to be exhaustive; various other dynamically adjustable parameters may facilitate operation of the illustrated embodiments or modifications thereof, and are encompassed by the present disclosure.

In the exemplary FIG. 1 arrangement, lid portion 20 is selectively coupled to body 10 such that finctional components of lid 20 may be operably engaged with cooperating components of body 10 during use. As noted above, for example, delivery line 21 may be coupled to delivery line 16 in body 10 at a fluid conduit junction 29 such that solvent may be delivered through lid 20 to receptacle 30 as indicated by the arrow in FIG. 1. Junction 29 may comprise or incorporate a quick-disconnect coupling or similar hardware, for example, preventing leakage or spillage of solvent from lines 16 and 21 when lid 20 is selectively disengaged from body 10 as set forth in more below with reference to FIG. 2. In that regard, lid 20 may be rotatably or otherwise movably coupled to body, such as at hinge 23.

Additionally, lid 20 may comprise or incorporate a heating unit 22 configured and operative to conduct sufficient heat to maintain solvent in line 21 at a desired or optimum operating temperature when delivered to receptacle 30. Heating unit 22 may comprise or be embodied as induction heating coils, for example, or any other heating element generally known in the art for transferring heat to a fluid conduit.

Though not illustrated in FIG. 1, one or more mechanical or chemical filters (such as carbon filters, ionizers, and ozone delivery units, for example) may also be incorporated into lid 20 in general, and line 21 in particular. In some embodiments, filtration may be provided in or associated with line 16 in body 10, but it may be desirable to provide suitable mechanical filtration or chemical treatments to solvent immediately prior to delivery to receptacle 30.

Figure 2:
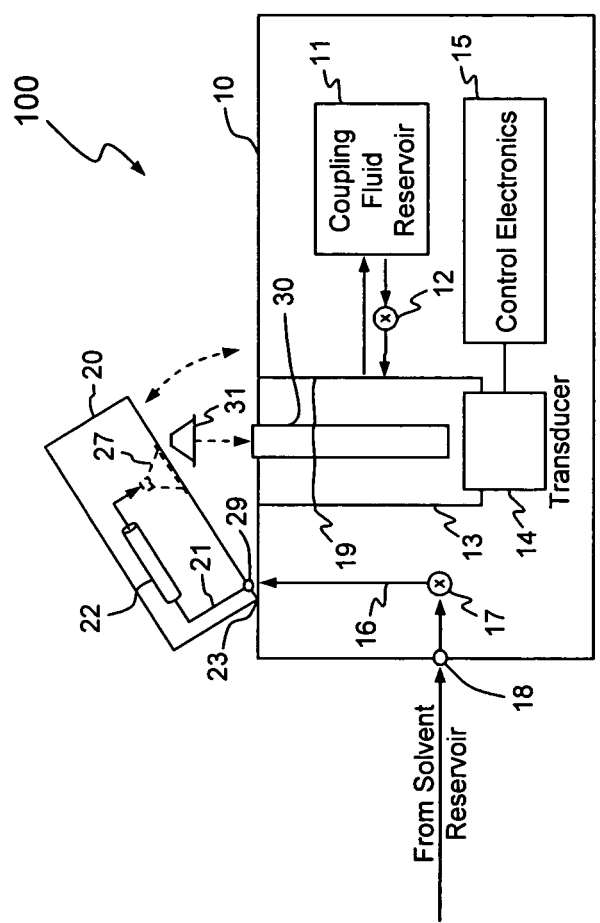
FIG. 2 is a simplified block diagram illustrating the general operation of the FIG. 1 embodiment of an ultrasonic dispersion apparatus.
Figure 3:
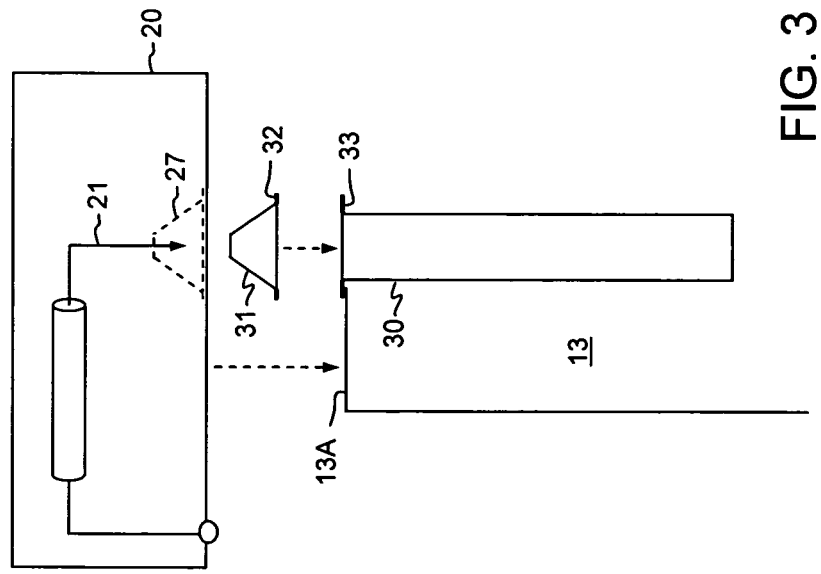
FIG. 3 is a simplified partially exploded block diagram illustrating the general operation of the FIG. 1 embodiment of an ultrasonic dispersion apparatus.

FIG. 2 is a simplified block diagram, and FIG. 3 is a simplified partially exploded block diagram, illustrating the general operation of the FIG. 1 embodiment of an ultrasonic dispersion apparatus. The various components illustrated in FIGS. 2 and 3 generally correspond to those described above in detail with reference to FIG. 1, and may incorporate some or all of the foregoing fimctionality and operational characteristics.

During use of apparatus 100, lid portion 20 may be selectively disengaged from body portion 10 as indicated. While lid 20 is illustrated as hinged with respect to body 10 (at hinge 23 in FIG. 2), other attachment options exist. While a hinged embodiment may facilitate interconnection of cooperating structures (such as conduit coupling 29 described above, for example, and dispenser 31 described below) when lid 20 is fully engaged with body 10, lid 20 may be slidably mounted on body 10, such as with guide rails or tracks, for instance. Alternatively, body 10 and lid 20 may be respectively provided with cooperating portions of interconnecting structures such as guide posts and apertures, tabs and slots, or other structural elements designed and operative to facilitate accurate alignment and secure connection of body 10 and lid 20.

While lid 20 is in the position indicated in FIG. 2, a loaded receptacle 30 may be inserted into or engaged with vessel 13; alternatively, receptacle 30 may be engaged with vessel 13 and subsequently loaded. In this context, "loaded" generally indicates that solid material to be dispersed has been deposited or disposed in receptacle 30. As indicated in FIG. 3, receptacle 30 and vessel 13 may comprise or incorporate cooperating structures configured and operative selectively to secure receptacle 30 at a desired location within the volume of vessel 13.

In particular, a flange 33 or other equivalent structural element (e.g., extending radially from the longitudinal axis of receptacle 30) may engage a cooperating rim 13A or upper surface of vessel 13. It will be appreciated that flange 33 may be appropriately dimensioned and positioned on receptacle 30 to support receptacle 30 from rim 13A in a desired orientation relative to the volume of vessel 13; accordingly, solid material and solvent in receptacle 30 may be maintained in a selected location in vessel 13 to facilitate reception of ultrasonic energy during operation of apparatus 100. As set forth above, the optimum location of receptacle 30 in vessel 13 may be influenced by various factors including, but not limited to: the volume and shape of vessel 13; the output frequency and intensity of transducer 14; the material used for receptacle 30; the selected coupling fluid and circulation flow rate; and the like.

When receptacle 30 has been loaded with solid material (either before or after insertion into vessel 13), dispenser 31 may be engaged or attached to receptacle 30 as shown. Dispenser 31 may be attached to receptacle 30 either prior or subsequent to introduction of receptacle 30 into vessel 13. In some applications, dispenser 31 may be disposed in recess 27 of lid 20 such that appropriate connections between dispenser 31 and receptacle 30 may be made automatically when lid 20 is fully engaged with body 10. In that regard, dispenser 31 may include a flange 32 or equivalent structure configured and operative to engage flange 33 on receptacle 30.

Figure 4:
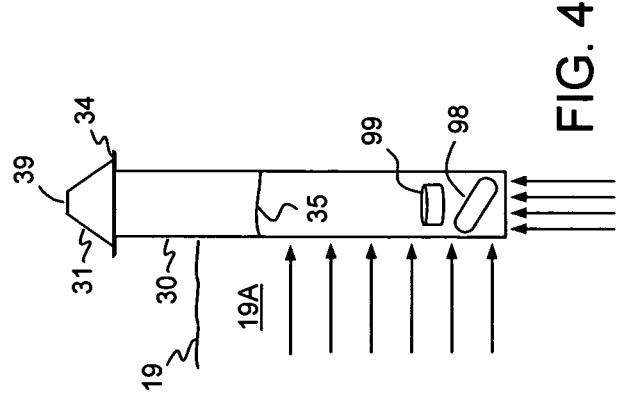
FIG. 4 is a simplified block diagram illustrating one embodiment of a receptacle.

Referring now to FIGS. 3 and 4, it is noted that FIG. 4 is a simplified block diagram illustrating one embodiment of a receptacle which may be employed in conjunction with an ultrasonic dispersion apparatus. In operation, recess 27 in lid 20 may be configured to accommodate dispenser 31 and to facilitate attachment of dispenser 31 to receptacle 30 when lid 20 is closed, or fully engaged with body 10. In accordance with this operating feature of apparatus 100, dispenser 31 may be inserted into recess 27 and receptacle 30 may be inserted into vessel 13 when lid 20 is in the position illustrated in FIG. 2; subsequently, lid 20 may be moved to the position indicated in FIG. 1. Appropriate connections between dispenser 31 and receptacle 30 may be made automatically when lid 20 is closed. Additionally or alternatively, tapered dispenser 31 may physically engage a mechanical or electromechanical switch (not shown) disposed within or otherwise associated with recess 27 when lid 20 is closed. Such an arrangement may allow electronics 15 to confirm that an appropriate receptacle 30 and dispenser 31 have been placed in suitable positions, and that lid 20 is in a correct orientation, for safe operation of apparatus 100; following such confirmation or a similar determination, electronics 15 may then commence dispersion automatically, for example, or allow dispersion processing to begin at a user's direction.

Dispenser 31 may be tapered toward an opening or aperture 39 through which solvent may be received by, or contents may be expelled from, receptacle 30. The tapered angle of dispenser 31 may be adapted, designed, or otherwise configured to fit directly into (or otherwise to engage) an entrance site of a naso-gastric or enteral feeding tube, for example. In some embodiments, the diameter of aperture 39 may be dimensioned to accommodate oral or other syringe tips with a secure fit, allowing spill-free, measured syringe withdrawal, in whole or in part, of the contents in receptacle 30.

In some embodiments, for example, one or both of flanges 32 and 33 may include or comprise pressure or heat sensitive adhesives or other bonding material; accordingly, when lid 20 and body 10 are fully engaged, sufficient pressure, heat, or both may be applied to flanges 32 and 33 (via recess 27 and rim 13A, for example) such that a seal 34 may bond or otherwise attach dispenser 31 and receptacle 30, preventing leakage of solvent and dispersed material at the junction of flanges 32 and 33. In some embodiments, flanges 32 and 33 may be configured and operative to engage each other and to create a leak-proof seal 34 without the benefit of adhesives or application of bonding techniques; various selectively interconnectible structural elements providing such a compression or contact fit for seal 34 are generally known in the art.

It will be appreciated that some structural elements supporting the foregoing functionality have been omitted from FIGS. 1-4 for clarity. By way of example, recess 27 may include one or more heating elements appropriately dimensioned and operative to apply suitable heat and pressure to flange 32 when lid 20 is closed; similarly, rim 13A may include depressions, protuberances, or other structural components appropriately dimensioned and operative to engage flange 33 in a desired manner. Those of skill in the art will recognize that various structural components and fínctional arrangements may be employed to achieve the results set forth herein, and that the exemplary embodiment is susceptible of numerous alternatives or modifications depending upon the overall system configuration.

During use of the apparatus depicted in FIGS. 1-3, a selected or predetermined volume of dispersion solvent may be provided or delivered to receptacle 30 automatically, for example, under control of electronics 15 as set forth above. In that regard, solvent may be pumped via line 21 through aperture 39 in dispenser 31. Alternatively, in some simplified embodiments, solvent may be provided to receptacle 30 manually, such as with a laboratory pipette or other measured fluid dispensing device, for example. In such alternative embodiments, solvent may be provided to receptacle 30 prior to attachment of dispenser 31, for instance, particularly in situations where aperture 39 is small relative to the dimensions of receptacle 30, the fluid dispensing device used to deliver the solvent, or both.

A selected volume of solvent may fill receptacle 30 to a solvent fill level represented by reference numeral 35. Tablets 99 or capsules 98 occupy volume in the loaded receptacle 30 of FIG. 4, and therefore, may influence solvent level 35 for a given volume of solvent. Similarly, the volume of solvent provided to receptacle 30 may be influenced by or determined, at least in part, as a fimction of the quantity and size of tablets 99, capsules 98, or other solid material loaded in receptacle 30. It will be appreciated that the solvent level 35, the coupling fluid level 19, and more particularly, the levels of each relative to the other, may be selectively adjusted in accordance with selected system parameters such as those mentioned above as well as the maximum operating temperature of the coupling fluid, the ultrasonic energy intensity, and the like. Solvent volume or level 35 may be controlled in accordance with logic or instruction code resident at or associated with electronics 15, for example, or responsive to operator input substantially as set forth above.

In some embodiments, for example, sensors may ascertain or monitor solvent level 35, and delivery of solvent to receptacle 30 may be controlled in accordance with solvent level 35 as indicated by sensor output. In such embodiments, total solvent volume may be a fuction of desired or predetermined solvent level 35, i.e., the volume of solvent delivered to receptacle may not be predetermined, but rather may vary as a function of the dimensions of receptacle 30 and the volume occupied by any solids loaded therein. As an alternative, solvent level 35 may be determined by delivery of a fixed or predetermined volume of solvent, i.e., solvent level 35 may vary as a function of desired or predetermined solvent volume delivered to receptacle 30. In such alternative implementations, an appropriate volume of solvent may be delivered to receptacle 30 regardless of the dimensions or contents thereof. As noted above, sensor output may be monitored and solvent delivery may be dynamically controlled, for example, by electronics 15.

For dispersion operations, ultrasonic energy may be coupled from coupling fluid 19A into solvent in vessel 30. While ultrasonic energy is represented by horizontal and vertical arrows in FIG. 4 for convenience and simplicity, it is noted that the energy coupled into receptacle 30 may have a plurality of directional components. For example, given a component arrangement such as illustrated and described above with reference to FIGS. 1 and 2, the general directionality of ultrasonic energy may be represented by the vertical arrows in FIG. 4, though other directional components may exist, particularly in embodiments employing additional or specially shaped transducers. Those of skill in the art will appreciate that the directionality of the ultrasonic energy contemplated in the present disclosure may be influenced by, among other factors, the shape, general orientation, and position (relative to vessel 13 and receptacle 30) of one or more transducers implemented in the system, for example, and is not intended to be limited by the FIG. 4 representation.

In the exemplary embodiment of FIGS. 3 and 4, receptacle 30 and dispenser 31 may be constructed of a flexible plastic, polymers, acrylics, or other similarly deformable material. In that regard, following dispersion operations, receptacle 30 may be squeezed or otherwise deformed, forcing the solution of solvent and dispersed solids through aperture 39 in dispenser 31. Receptacle 30, and more particularly, the combination of receptacle 30 and dispenser 31, may be economically manufactured of any of the foregoing or equivalent materials, and may be disposable. Where receptacle 30 and attached dispenser 31 are implemented as single use, disposable units providing individual doses of medication, minimal cleaning of apparatus 100 may be required between dispersion operations, and the possibility of cross contamination from one dose of medication to the next may be minimized or eliminated.

Figure 5:
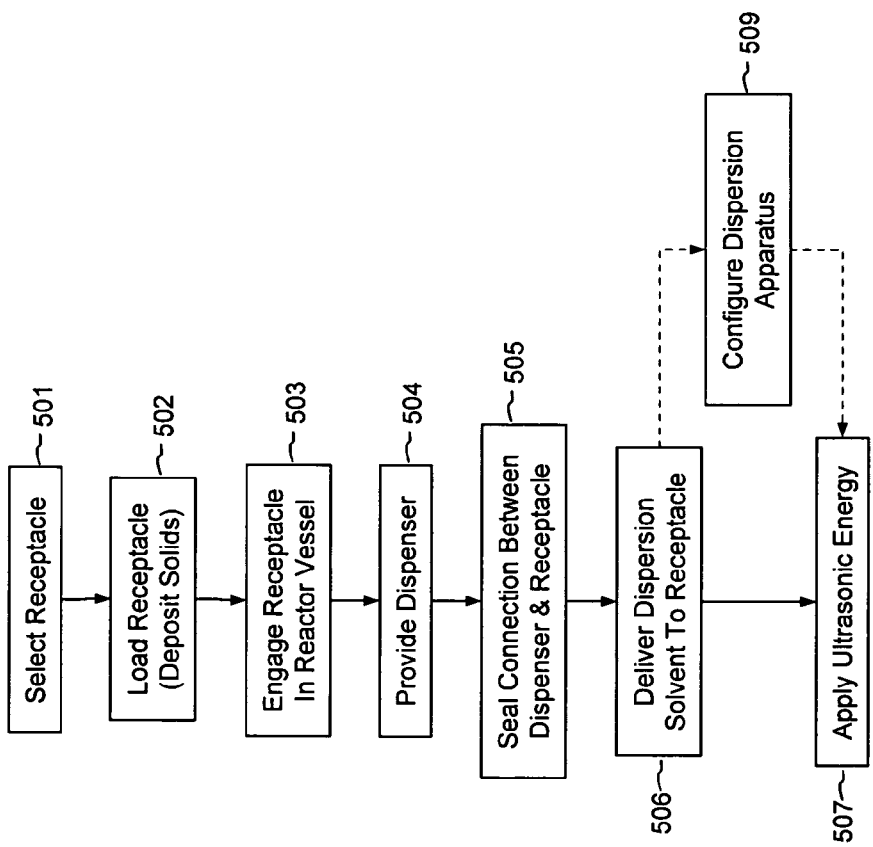
FIG. 5 is a simplified flow diagram illustrating the general operation of one embodiment of an ultrasonic dispersion method.

FIG. 5 is a simplified flow diagram illustrating the general operation of one embodiment of an ultrasonic dispersion method. While the operations depicted in FIG. 5 may be executed by an apparatus such as described above with reference to FIGS. 1-4, it will be appreciated that other devices and combinations of functional components may be employed in accordance with the scope and contemplation of the present disclosure.

A receptacle may be selected as indicated at block 501. A receptacle such as illustrated and described above with reference to FIGS. 3 and 4 may be selected in accordance with the construction and configuration of the dispersion apparatus, for example, such that the receptacle is so dimensioned to engage structural elements of the dispersion apparatus. Additionally or alternatively, a receptacle may be selected in accordance with its size, shape, and material composition, for example, or as a function of the presence or inclusion of one or more appropriate pre-loaded chemical additives; as noted above, inexpensive disposable receptacles constructed of flexible plastics or acrylics may be useful for some applications.

The receptacle may be loaded with solid material to be dispersed as indicated at block 502. One or more tablets, capsules, or caplets, or some combination thereof, for example, may be deposited in the receptacle. In some instances, the particular type of solid to be dispersed, as well as the overall volume and chemical composition of its particular constituents, may influence selection of the receptacle to be used as described above with reference to block 501. It will be appreciated that loading the receptacle may be completed manually by an operator or technician, for example. Alternatively, such loading may be facilitated by one or more automated devices, robotic components, or mechanical systems; such robotic apparatus may comprise or be embodied as those typically used in the pharmaceutical industry or at hospitals, infirmaries, pharmacies, and other health care facilities to handle drugs so as to prevent contamination of medicines and other solids intended for administration to patients.

The receptacle may be engaged with or disposed in a reactor vessel, as indicated at block 503, and a dispenser may be provided (i.e., attached or secured to the receptacle) as indicated at block 504, substantially as set forth above with reference to FIGS. 1-4. In accordance with the FIG. 2 embodiment, for example, a dispenser may be automatically provided and engaged with a receptacle when the lid portion of a dispersion apparatus is brought into contact with the body portion; alternatively, a dispenser may be manually fitted, attached, or otherwise engaged with the receptacle by hand.

As noted above with reference to FIG. 4, the dispenser and the receptacle may be sealed at the connection thereof, preventing leakage or seepage of solvent and dispersed material at the junction of the dispenser and the receptacle. In that regard, sealing the dispenser and the receptacle as indicated at block 505 may comprise utilizing heat sensitive or pressure sensitive adhesives, for example, or selectively heating portions of dispenser, receptacle, or both, to create a heat seal or other leak-proof union of the components.

Dispersion solvent may be provided to the receptacle as indicated at block 506. In some embodiments noted above, for example, the type and volume of solvent delivered to the receptacle may be automatically controlled by electronics incorporated in or associated with the dispersion apparatus. Alternatively, solvent may be provided manually; in some instances, manual addition of solvent may occur prior to any of the operations represented by blocks 502-505, for example, and in particular, prior to the providing and sealing operations indicated at blocks 504 and 505.

Ultrasonic energy sufficient to cause dispersion may be applied to the receptacle (and therefore, to the solid material to be dispersed) as indicated at block 507. In the embodiments illustrated and described above with reference to FIGS. 1-4, application of such ultrasonic energy may generally comprise coupling energy (in the form of ultrasonic waves) into the receptacle through a coupling fluid maintained at a predetermined level in the reaction vessel. As an alternative, however, applying ultrasonic energy to the receptacle may comprise inserting or otherwise disposing a sonic probe or ultrasonic transducer component directly into the receptacle.

As indicated at block 509, a dispersion apparatus may be configured in connection with applying ultrasonic energy to the receptacle. In that regard, a dispersion apparatus as illustrated and described herein may include electronics selectively configurable in accordance with user input substantially as set forth above. Volume of coupling fluid delivered to the reactor vessel, as well as the circulation flow rate and the operating temperature thereof, for example, may be specified during operations at block 509. Additionally or alternatively, the frequency, amplitude, and other parameters (such as overall duration or intermittent pulse times) affecting ultrasonic energy output of the transducer may also be selectively configured at block 509. Further, as noted above, the nature and the amount of solvent delivered to the receptacle may also be selectively controlled; in that regard, operations at block 509 may precede or occur in conjunction with operations at block 506.

The FIG. 5 embodiment is presented for illustrative purposes only, and is not intended to imply an order of operations to the exclusion of other possibilities. By way of specific example, the operations depicted at blocks 502 and 503 may be reversed, for instance, as set forth in detail above, or may be executed substantially simultaneously. Those of skill in the art will appreciate that the particular sequence in which the operations depicted at blocks 501-509 are conducted may be influenced by, among other factors, the finctionality and structural configuration of a particular dispersion apparatus, the operational characteristics of a system in which such an apparatus is incorporated, or both.

Figure 6:
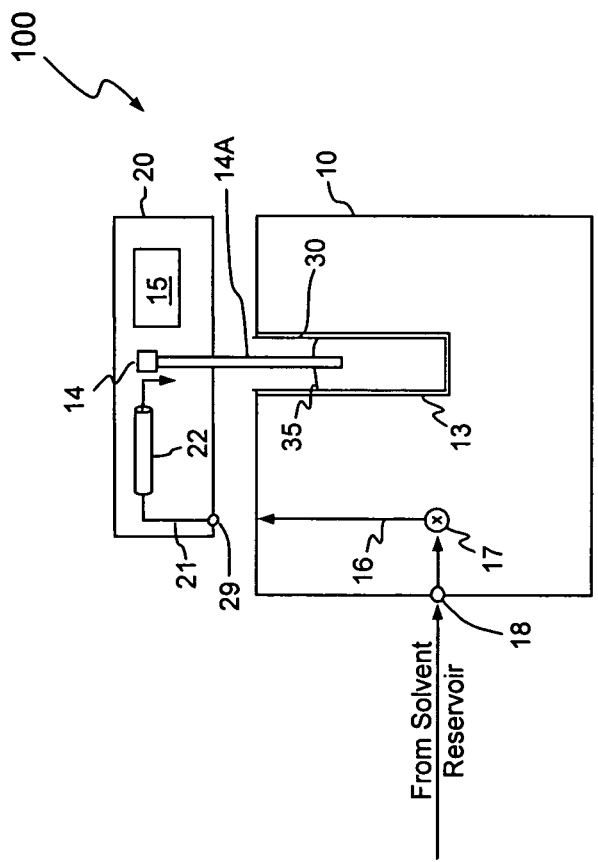
FIG. 6 is a simplified block diagram illustrating another embodiment of an ultrasonic dispersion apparatus.

FIG. 6 is a simplified block diagram illustrating another embodiment of an ultrasonic dispersion apparatus. The acoustic intensity within an ultrasonic bath (such as depicted in FIGS. 1-4, for example) may be limited, location dependent, and inconsistent. These aspects of an ultrasonic bath may be due, at least in part, to fluctuations or perturbations in the level and temperature of the coupling fluid as set forth above. An ultrasonic probe system exemplified in the FIG. 6 illustration may not require coupling fluid, and may provide consistent ultrasonic power to the solvent and the solid to be dispersed substantially as set forth below.

In the FIG. 6 probe embodiment, for example, it is possible to provide ultrasonic energy up to two orders of magnitude greater than can be achieved using an ultrasonic bath. In addition to the components described in detail above, the FIG. 6 dispersion apparatus 100 may generally comprise an ultrasonic transducer 14 and a detachable acoustic horn (velocity transformer) 14A, the combination of which may be embodied as a probe system. Acoustic horn 14A may generally be used to amplify the acoustic energy generated by transducer 14 as set forth above.

In the FIG. 6 arrangement, transducer 14, horn 14A, and control electronics 15 may be associated with or integrated with lid portion 20; in this embodiment, electronics 15 may still control operation of solvent delivery pump 17 as described above, for example. Since operation of apparatus 100 illustrated in FIG. 6 may not require coupling fluid for providing ultrasonic energy to receptacle, body 10 may be simplified relative to the embodiments described above. For example, reaction vessel 13 may be simply constructed and operative to accommodate a particular receptacle 30. In a more flexible or adaptable embodiment, vessel 13 may be large enough to accommodate various types of receptacles, and may be provided with an adjustable top portion (such as rim 13A described above with reference to FIG. 3) selectively operative to engage receptacles of differing sizes and shapes.

During operation of apparatus 100, when lid 20 is engaged with body 10, horn 14A may extend into the solvent (i.e., below solvent level 35) in receptacle 30 and may directly apply ultrasonic energy to that solvent and, in particular, to the solid material loaded into receptacle 30. In general terms, the larger the emitting surface of horn 14A (and specifically, the greater the surface area in contact with the solvent in receptacle 30), the higher the acoustic power transmitted to the solvent and to the solid to be dispersed; simultaneously, power density transmitted to the solvent is decreased with increasing surface area of horn 14A in contact with the solvent.

The maximum amount of power generated by transducer 14 and horn 14A may be limited by the properties of the material from which these components are constructed. As is generally known in the art, appropriate characteristics for material used in acoustic horns include, but are not limited to, the following properties: high dynamic fatigue strength; low acoustic loss; and resistance to cavitation erosion. Additionally, material used to construct acoustic horn 14A may be chemically inert. Accordingly, horn 14A may comprise or be constructed of titanium, titanium alloys, or other metals having similar material properties or behavioral characteristics.

A submersible transducer/horn system as illustrated in FIG. 6 conveniently converts any receptacle 30 into an ultrasonic bath, and omits the complexities of a coupling fluid dependent system with attendant pumping hardware, valving, heat transfer devices, and the like.

In the FIG. 6 arrangement, it will be appreciated that horn 14A is immersed in the solvent which will ultimately be administered to a patient. Accordingly, horn 14A may be provided with a removable, disposable, protective sheath or sleeve, for example, which may prevent cross contamination from one dispersion operation to the next. Such a disposable protective sleeve may be constructed of or comprise plastic or acrylic, for example.

Figure 7:
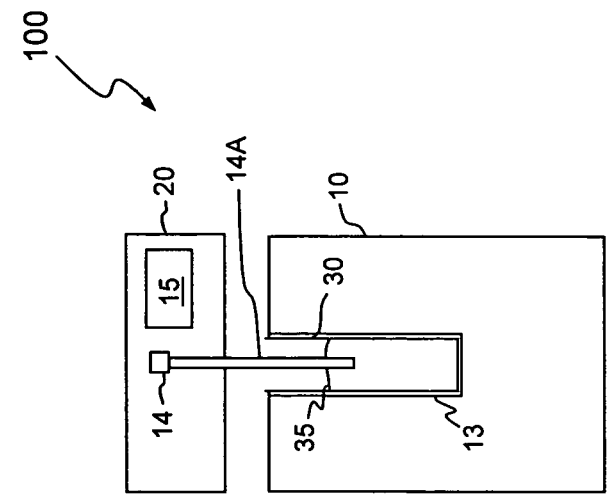
FIG. 7 is a simplified block diagram illustrating another embodiment of an ultrasonic dispersion apparatus.

FIG. 7 is a simplified block diagram illustrating another embodiment of an ultrasonic dispersion apparatus. The FIG. 7 probe system is a simplified version of the embodiment illustrated in FIG. 6; in particular, the solvent delivery components have been omitted from the FIG. 7 structural arrangement. In that regard, the FIG. 7 dispersion apparatus 100 may simply comprise a body portion 10, including a reactor vessel 13 configured to receive a receptacle 30, and a lid portion 20 including an ultrasonic transducer 14 and an acoustic horn 14A coupled to control electronics 15.

As with the FIG. 6 arrangement, transducer 14, horn 14A, and electronics 15 may be integrated with lid 20. Lid 20 may also comprise a DC power source, an AC power input (and an associated transformer, if required), or some combination thereof, to provide operating voltage to electronics 15, transducer 14, and an associated ultrasonic generator. As noted above, reaction vessel 13 may be simply constructed and operative to accommodate a particular receptacle 30; alternatively, vessel 13 may be large enough (and may be provided with an adjustable top portion) to engage and to accommodate vessels of various sizes and dimensions.

During operation of apparatus 100, when lid 20 is engaged with body 10, horn 14A may extend into the solvent (i.e., below solvent level 35) and may directly apply ultrasonic energy to the and to the solid material loaded into receptacle 30.

As set forth above with reference to FIG. 6, horn 14A may comprise or be constructed of titanium, titanium alloys, or other metals having similar material properties or behavioral characteristics. Additionally, horn 14A may be provided with a disposable protective sleeve, preventing cross contamination from one dispersion operation to the next.

In the FIG. 7 arrangement, the omission of solvent delivery conduits and attendant connections may enable lid 20 and body 10 to be engaged with threads, for example, such that lid 20 may be screwed or twisted onto body 10 during operation. As with the apparatus described above, the exemplary FIG. 7 embodiment may enable a user to configure or otherwise to control parameters affecting ultrasonic energy output of transducer 14 and horn 14A. In that regard, electronics 15 may be coupled to or associated with input/output hardware or firmware modules. For example, lid 20 may comprise a display panel or an array of light emitting diodes (LEDs) operative to display current settings or system parameters, and a key pad operative to receive user input regarding desired modifications. Accordingly, ultrasonic power (ie., frequency and amplitude) as well duration may be selectively adjusted in real time by an operator through interaction with hardware influencing operation of electronics 15.

The present invention has been illustrated and described in detail with reference to particular embodiments by way of example only, and not by way of limitation. Those of skill in the art will appreciate that various modifications to the exemplary embodiments are within the scope and contemplation of the present disclosure.

The invention claimed is:

1. A method of dispersing solid medications, the method comprising:
    manually loading a receptacle with the solid medication, wherein the solid medication comprises one of a tablet, a capsule, and a caplet;
    coupling an ultrasonic transducer to the receptacle;
    programmably configuring a parameter affecting ultrasonic energy output of the ultrasonic transducer as a function of the solid medication, the parameter comprising an intermittency of the ultrasonic energy;
    dispersing the solid medication within a liquid in the receptacle by providing ultrasonic energy to the immersed solid medication so as to form a liquefied medication; and
    uncoupling the receptacle from the ultrasonic transducer.

2. The method of claim 1 wherein dispersing the solid medication produces a suspension.

3. The method of claim 1 wherein dispersing solid medication produces a solution.

4. The method of claim 1 wherein dispersing the solid medication produces an emulsion.

5. The method of claim 1 wherein the solid medication includes one or more drugs.

6. The method of claim 1, further comprising configuring a directionality of the ultrasonic energy.

7. The method of claim 1, further comprising configuring a frequency of the ultrasonic energy.

8. The method of claim 1, further comprising configuring an amplitude of the ultrasonic energy.

9. The method of claim 1, further comprising configuring a duration of the ultrasonic energy.

10. The method of claim 1 wherein the coupling includes providing a coupling medium between the ultrasonic transducer and the receptacle.

11. The method of claim 1, and further comprising heat to the liquid whereby delivering heat hastens ultrasonically assisted dispersion of the solid medication.

12. The method of claim 11, wherein the solid medication includes gelatin encapsulated drugs.

13. The method of claim 1, wherein the solid medication includes one or more agglomerates or one or more bulk solid bodies.

14. The method of claim 1, wherein the coupling is via acoustic energy.

15. The method of claim 1, wherein programmably configuring an intermittency of the ultrasonic energy comprises programmably configuring pulse times of the ultrasonic energy.

\* \* \* \* \*